Oct. 11, 1960     H. R. BILLETER ET AL     2,955,797
FLUID VALVE MECHANISM

Filed Nov. 15, 1955     5 Sheets-Sheet 1

HENRY ROBERT BILLETER
GEORGE B. RICHARDS
*INVENTORS*

BY
*Fidler, Crowell & Beardsley*
ATTORNEYS

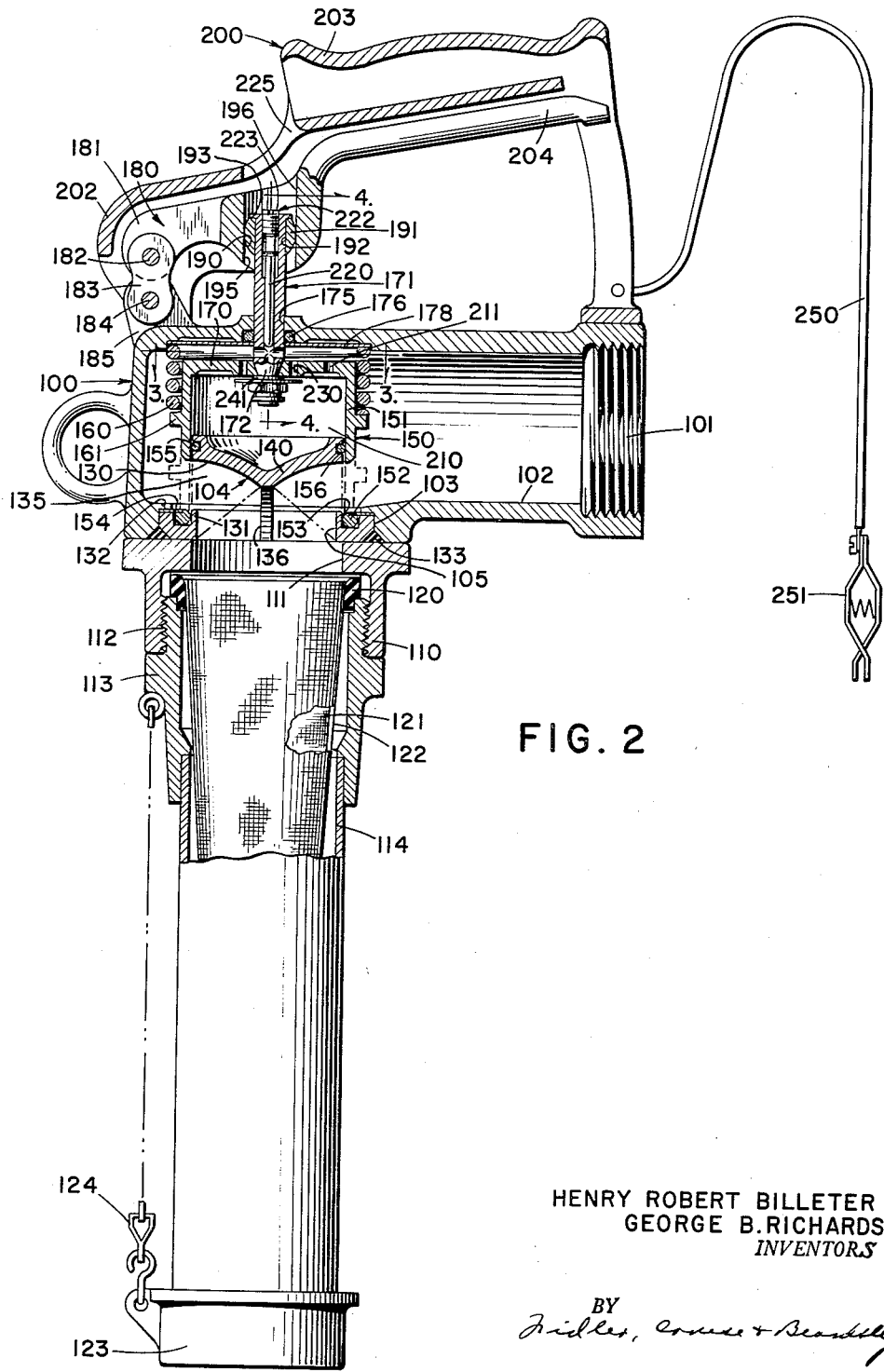

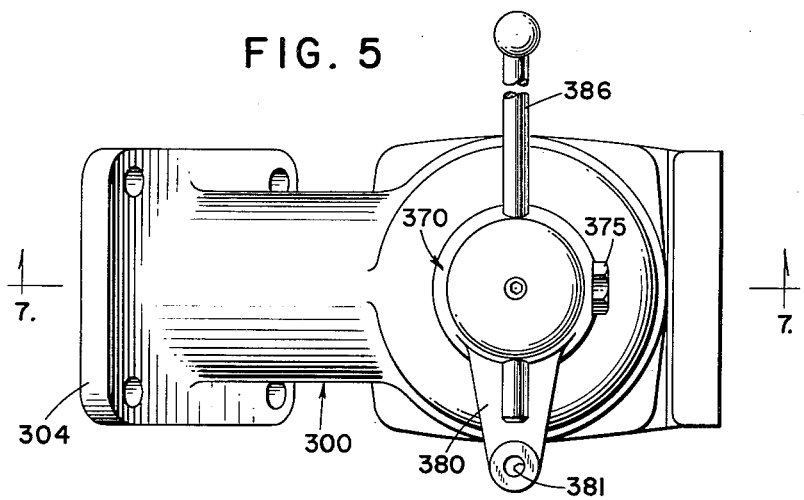
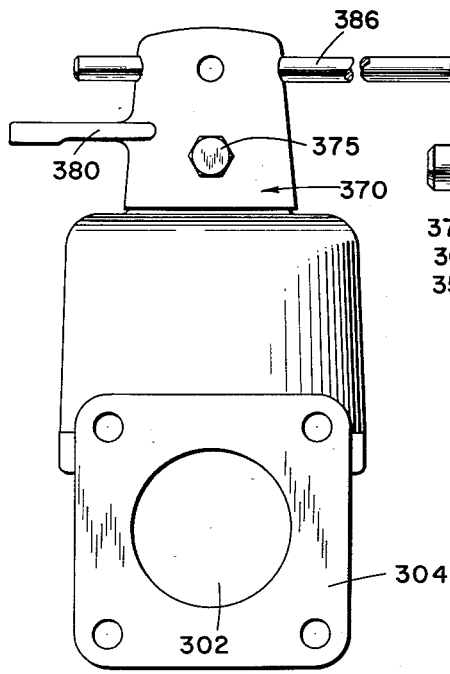
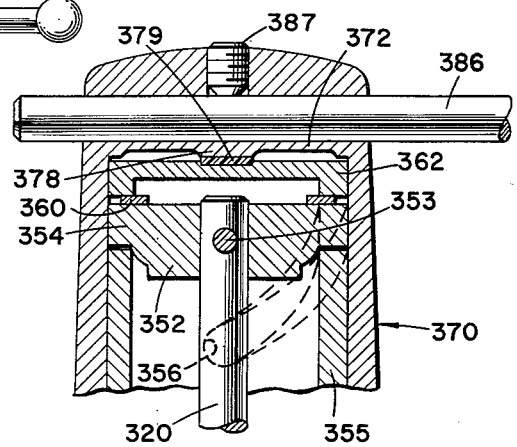

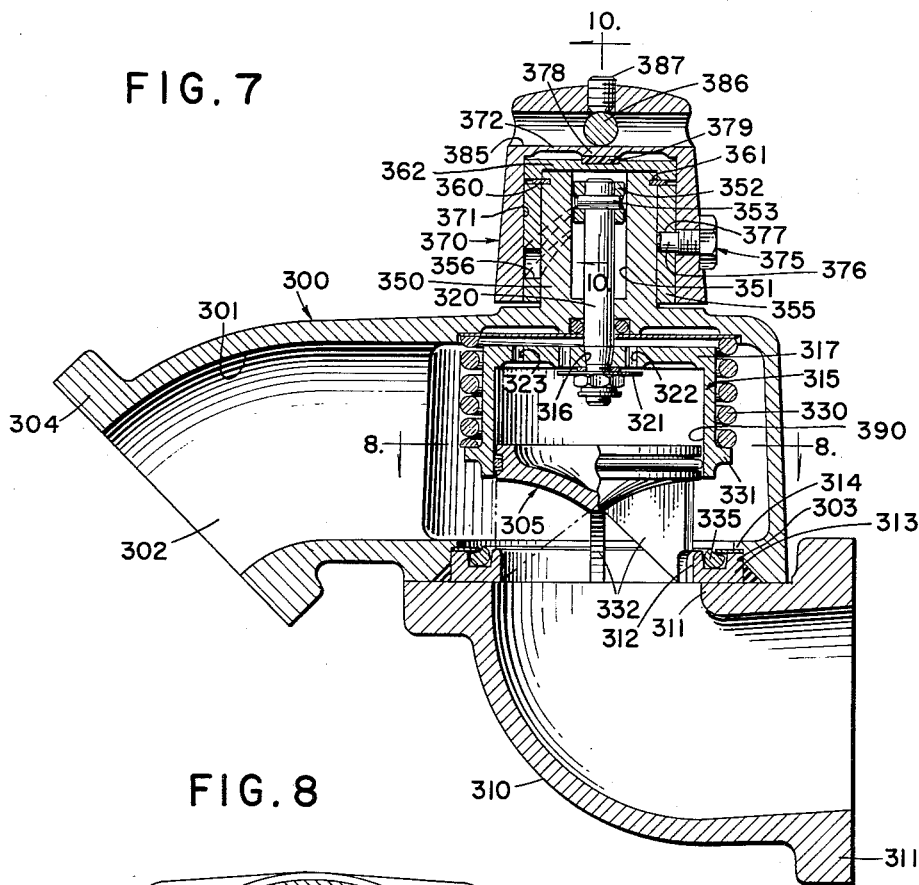
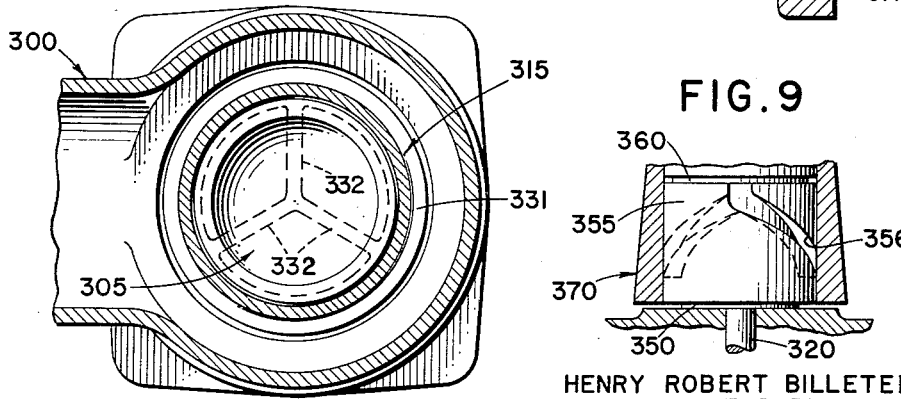
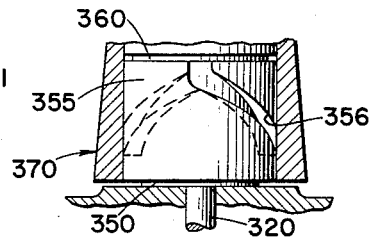
HENRY ROBERT BILLETER
GEORGE B. RICHARDS
INVENTORS

HENRY ROBERT BILLETER
GEORGE B. RICHARDS
INVENTOR.

United States Patent Office 2,955,797
Patented Oct. 11, 1960

2,955,797
FLUID VALVE MECHANISM

Henry R. Billeter and George B. Richards, Deerfield, Ill., assignors, by mesne assignments, to Liquid Controls Corporation, North Chicago, Ill., a corporation of Illinois Filed Nov. 15, 1955, Ser. No. 546,978

8 Claims. (Cl. 251—51)

This invention relates generally to fluid valve mechanisms and has to do more particularly with fluid valve mechanisms of the self-closing type embodying means for controlling the speed of closing of the valve.

Valves as heretofore constructed for controlling the flow of liquids have often been of the poppet type. Such valves are subject to the closing action not only of the valve closing spring but also of the force exerted by the liquid behind the valve, which in some cases may be very great. In fact, the valve may be closed so rapidly as to rupture the liquid line. Also, where the valve is employed in a portable nozzle at the end of a flexible hose, the force thus exerted on the nozzle may be so great as to pull it out of the operator's hand. Attempts have been made heretofore to prevent this rapid closing of the valve including the provision of a dash-pot or like device separate from but connected to the valve for preventing the too rapid closing of the valve. Such devices require parts in addition to the valve parts and additional space in the valve housing. When a valve of the poppet type moves toward closed position, the velocity of the stream of fluid flowing through the valve seat orifice is retarded with the result that the inertia of the fluid behind the valve increases the fluid pressure on the valve tending to close it. The further the valve moves toward closed position the greater is such inertia-induced pressure and the valve in many cases will be slammed shut. Since, a dash pot device such as heretofore employed provides a uniform resistance to the closing of the valve, such a device is inadequate to control the rate of closing of the valve or to cushion the final closing movement of the valve.

An object of our invention is to provide a novel self-closing valve mechanism embodying means for automatically controlling the closing speed of the valve.

Another object is to provide a self-closing valve mechanism which is substantially balanced whereby the opening or closing movement is not materially influenced by the fluid pressure in the line and having embodied therein means for automatically controlling the closing speed of the valve.

Still another object is to provide a self-closing valve which is substantially balanced but which has embodied therein means whereby any unbalanced condition which may be created by flow of liquid through the valve seat orifice is utilized to aid in retarding the speed of closing of the valve and in cushioning the final closing movement.

Another object is to provide a self-closing valve mechanism having means for controlling the speed of closing of the valve which is simple, compact and positive in operation.

Another object is to provide a self-closing valve mechanism having means for automatically controlling the closing speed of the valve which is readily adjustable from exteriorly of the valve housing to adjust the closing speed of the valve. A further object is to provide a new and improved valved nozzle for fluid lines.

Another object is to provide a valved nozzle for fluid lines adapted for manual operation to open the valve and to retain it in open position and wherein is embodied means for automatically controlling the closing speed of the valve.

Still another object is to provide a new and improved valve opening mechanism embodying a novel cam mechanism whereby the valve may be readily opened with the application of a relatively small force.

Another object is to provide a substantially balanced self-closing valve having a sleeve-like element slidable across the valve port to close the latter and cooperating with a fixed portion of the valve structure for automatically controlling the speed of closing of the valve.

A still further object is to provide a new and improved liquid dispensing nozzle embodying a self-closing valve having incorporated therein means for controlling the speed of closing of the valve whereby the nozzle may be readily manipulated to open it for permitting flow of liquid therethrough, but it may be simply released to allow it to close, whereupon the valve will close at a speed such as will not cause any detrimental effects in the line or cause the nozzle to be pulled out of the operator's hand.

Other objects and advantages of the invention will appear from the following description taken in connection with the appended drawings wherein:

Fig. 2 is a vertical sectional view taken along line 2—2 of Fig. 1;

Fig. 5 is a top plan view of a second embodiment of our invention;

Fig. 6 is an end elevational view of the valve of Fig. 5;

Fig. 7 is a vertical sectional view taken along line 7—7 of Fig. 5;

Fig. 8 is a horizontal sectional view taken along line 8—8 of Fig. 7;

Fig. 9 is a fragmentary sectional view showing a detail of the actuating cam;

Fig. 10 is an enlarged, fragmentary sectional view taken along line 10—10 of Fig. 7.

Figure 1:
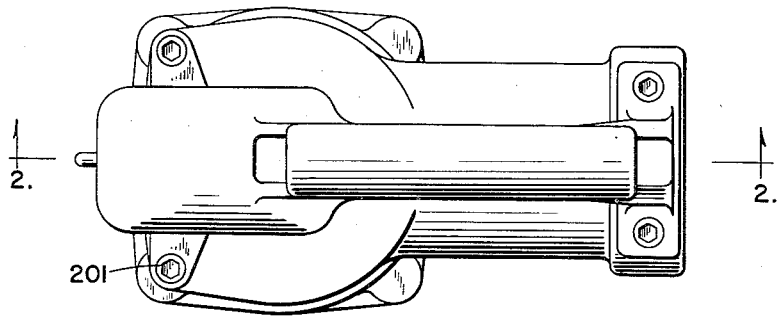
Figure 1 is a top plan view of a preferred embodiment of our invention.
Figure 3:
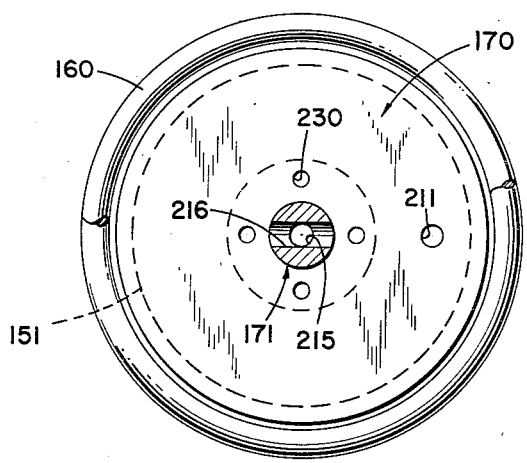
Fig. 3 is an enlarged, horizontal sectional view taken along line 3—3 of Fig. 2.
Figure 4:
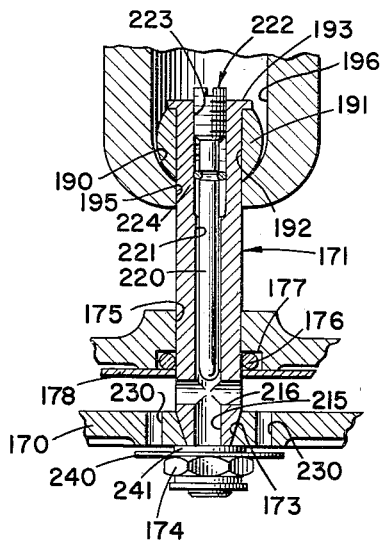
Fig. 4 is an enlarged, vertical sectional view taken along line 4—4 of Fig. 2.

The valve mechanism of our invention is well adapted for application in a wide variety of uses. For the purposes of illustrating our invention we have disclosed it in connection with its application to two such uses but it will be understood that it is not limited to such uses.

Referring now particularly to Figs. 1 to 4, the valve of our invention is shown in connection with its application to a nozzle adapted to be attached to the end of a flexible hose for filling a tank with liquids withdrawn from another tank. Such nozzles are commonly employed in withdrawing liquid fuels from storage tanks for the purpose of filling the fuel tanks of aircraft, automotive vehicles and power boats and for filling storage tanks from tank cars, tank trucks and tanker ships.

The nozzle includes a casing member 100 of hollow form and having an inlet opening 101 at one end which is provided with internal threads for connection to a flexible hose (not shown) which may be connected to a storage tank or other source of liquid to be dispensed.

The casing 100 preferably is of generally cylindrical form and has an end wall closing the end opposite the inlet opening 101. The interior of the casing 100 provides a valve chamber 102 as will hereinafter appear. The side wall of the casing 100 is formed with an opening 103 in which is disposed a valve seat member 104, hereinafter described, having a discharge opening or outlet port 105 extending therethrough. A spout-connecting member or socket 110 is secured in a suitable manner, as by screws (not shown), to the lower portion of the casing 100 and in registry with the outlet opening 105. The member 110 is of generally tubular form and has an opening 111 registering with the opening 105. The member 110 is provided with internal threads 112 in which is threaded a sleeve 113 which carries a cylindrical spout member 114, the latter being secured to the sleeve 113 in a suitable manner, as by welding.

Interposed between and secured in place between the sleeve 113 and the socket member 110 is a ring 120 formed of suitable resilient sealing material and which serves to support a filter screen element 121 of relatively fine mesh, as for example, 100 x 90 mesh 0.004 wire. The ring 120 also supports exteriorly and in surrounding relation to the filter screen a heavier protective screen 122 formed of heavier wire for example 0.032 wire and of coarser mesh for example 6 x 6 mesh. The filter member 121 and protecting member 122 extend to close to the lower end of the spout member 114 and the filter member at least is closed at its lower end so that no solid materials larger than the openings in the filter member can pass therefrom.

A closure cap 123 of conventional construction is provided for placement over the end of the spout member 114 for closing it when the nozzle is not in use and such cap is connected as by a chain 124 or other retaining element to the casing 100 in a suitable manner.

The relatively fixed valve element 104 is of generally cylindrical construction and has a laterally extending annular flange 131 at its lower portion which is clamped between the casing member 100 and the socket member 110, in the opening 103, the casing member 100 being provided with an inturned flange 132 at the upper end of the opening 103 for retaining the flange 131. A seal 133, preferably of resilent sealing material, is provided for sealing the joint between the casing 100, the socket member 110 and the valve element 130, the lower faces of the casing 100 and the valve element 130 being suitably recessed to receive such seal.

The fixed valve member 104 is formed with a sealing or end wall 140 disposed opposite the discharge port 105 and in alignment therewith for purposes which will hereinafter appear. The end wall 140 is connected to the flange 131 by a plurality of vertical partitions 136 disposed in a generally radial arrangement and providing therebetween a plurality of passages or inlet ports 135 communicating with the interior of the casing 100 and with the discharge port 105 to allow liquid to flow through the fixed valve member 104.

The inner face 130 of the end wall 140 preferably is of generally conical form with the face concavely arcuate in shape, as shown, in order to provide a somewhat streamlined flow of liquid from the ports 135 toward the outlet opening. The end wall as a whole is of generally conical shape although it may take other suitable shapes.

A movable valve member 150 is provided for the purpose of controlling the opening and closing of the ports 135 in the fixed valve member 130. The member 150 is of generally cupped form and has a generally cylindrical portion 151 which is received over and slidably supports the valve member 150 on the fixed valve member 130. The movable member 150 is slidable on the fixed valve member 130 between a position (as shown in full lines in Fig. 2), wherein the ports 135 are open and exposed so as to provide communication between the valve chamber and the ports 135 and a closed position (shown in broken lines in Fig. 2), wherein the movable member 150 is in a position closing the ports and preventing communication between the valve chamber 102 and the ports 135.

The movable valve member 150 when in closed position cooperates with the lower portion of the fixed valve member 130 and with the portion of the member 130 above the ports 135 for closing the ports. In order to provide a complete seal so that there is no leakage past the cooperating members, we provide a resilient seal which preferably takes the form of an O ring 152 disposed in an upwardly open groove 153 formed in the flange portion 131. The O ring 152 is formed of a suitable material such as a synthetitc rubber-like material which is suitably inert to the fluids with which the valve is adapted to be used and has sufficient resilience and flexibility to insure that a complete seal is provided. In order to prevent the O ring from being forced out of its seat, we provide a retainer ring 154 preferably of rigid construction and secured between the casing member 100 and the top face of the flange 131 and in position to sufficiently overlie the O ring to provide a restricted opening in the groove 153 of such small lateral extent that the O ring cannot be forced therefrom in the operation of the valve.

The O ring is positioned so that it is engaged by the lower edge of the movable valve member 150 when the latter is in its lowermost or closed position.

A second and upper seal is provided between the two valve members which also principally takes the form of an O ring 155. The latter is disposed in a circumferentially extending groove formed in the periphery of the wall 140 of the fixed valve member 130 above the port and in position to engage at all times the inner surface of the cylindrical portion 151 of the movable valve member 150. Thus the seal 155 serves to prevent the passage of fluid from the valve chamber 102 past the two valve members 104 and 150 at the upper end of the former. In addition it serves another sealing function which will be described hereinafter.

The movable valve element 150 is urged toward closed position by a spring 160 which bears at its lower end against a flange 161 formed on the movable valve element 150 and at its other end against the upper wall of the casing 100. The spring 160 is of sufficient strength to close the valve rapidly and to insure that the movable valve element 150 seats against the seal 152 with sufficient force that a leak-proof seal is provided under all conditions of operation of the valve mechanism.

As will appear hereinafter the movable valve member 150 is moved out of closed position by the manually operated actuating mechanism and the valve member 150 may be allowed to move to closed position under the control of the operator. However, the movable member 150 is always urged toward the closed position by the spring 160 and is held in such position except when the operator manipulates the actuating mechanism to move the valve 150 out of closed position and to hold it out of closed position. It will be further understood that the operator may so manipulate the actuating mechanism as to limit the rate of closing of the valve to a slower rate than that provided in the valve mechanism.

Means are provided exteriorly of the casing for manually opening the valve. To this end we provide the movable valve member 150 with an upper end wall 170 joined to the cylindrical wall portion 151. For a purpose which will hereinafter appear the end wall 170 is of such form as to extend over and close the upper end of the cylindrical portion 151 except for the orifices hereinafter described. Secured to the end wall 170 is a valve stem or actuating member 171 which is formed preferably with a tapered lower end portion 172 fitted into a correspondingly shaped opening 173 in the wall 170 and projecting into the space between the wall 170 and the wall 140 of the fixed valve member. The stem 171 is secured in the wall 170 in a suitable manner as by a nut 174.

The stem 171 extends upwardly through an opening 175 formed in the upper wall of the casing 100 for sliding movement therein and is sealed therein by a seal, as for example an O ring 176 seated in a recess 177 in the inner face of the upper wall of the casing 100 and is secured therein in a suitable manner as by a plate 178 which is held in place by the spring 160.

The stem 171 is connected by a ball and socket connection to a handle 180 for actuating the valve. The handle has a lever portion 181 which is pivotally connected as by a pin 182 to a link 183 which in turn is pivotally connected as by a pin 184 to a clevis 185 secured to and preferably formed integrally with the casing 100. This arrangement, as explained more in detail hereinafter, permits the handle 180 to pivot about the pivot 182 which in turn is free to swing to a limited extent about the pivot 184. This swinging, pivotal connection permits the valve stem 171 to be moved vertically by pivotal movement of the handle 180.

The handle 180 is provided with a hemispherical ball seat 190 adapted to receive and support a ball 191 having a bore 192 extending therethrough in which is slidably disposed the valve stem 171. The valve stem 171 is formed with a flange 193 at its upper end in order to limit downward movement of the valve stem 171 in the bore 192 and to permit the valve stem to be raised by the upward movement of the ball 191 as produced by the corresponding upward swinging movement of the lever 180. The portion of the handle below the ball socket 190 is formed with a slot 195 of sufficient width to receive the valve stem 171 therethrough and of sufficient lateral dimension to permit the angular movement relatively to the stem of the lever 180 sufficient to permit raising and lowering of the valve stem.

A bore 196 is formed in the lever 180 in order to permit insertion of the valve stem and ball into the lever for assembling the ball in its seat and for connecting the stem 171 to the movable valve member 150. Also the bore 196 permits insertion of a tool for making the adjustments hereinafter described.

A handle 200 is secured to the upper portion of the casing 100 in a suitable manner as by screws 201. The handle 200 is of generally U-shaped form and has a channel portion 202 adapted to receive and protect the link 183 and the adjacent portion of the lever 180. The handle also has a grip portion 203 disposed above the handle portion 204 of the lever 180 which portion 203 serves not only to provide a grip for convenience in holding the nozzle but also provides a fixed reaction member which the operator can grip, along with the handle portion 204 of the lever, in order to exert the necessary upward force on the lever 180 to open the valve.

Means are provided for automatically limiting the feed or rate of pressure on the valve by the spring 160. Thus even though the operator should entirely release the lever 180 the valve will close only at the predetermined rate at controlled by such means. It will be understood of course that the operator may, by retaining his grip on the handle portion of the lever 180 control the closing of the valve so that it closes at a slower rate than is provided for by the automatic means.

The end wall 170 of the movable wall member 150 is made imperforate except as hereinafter explained and accordingly the movable valve member 150 defines with the wall 140 an inner chamber 210. The wall members 130 and 150 therefore cooperate in the manner of the piston and cylinder of a dash-pot mechanism to limit the rate of closing movement of the valve member 150. In order to permit the passage of fluid between the inner or dash-pot chamber 210 and the valve chamber 102 an orifice 211 is provided, preferably in the valve member 150 and preferably in the end wall portion thereof. The orifice 211 preferably is a fixed orifice so that the rate of flow therethrough in either direction (depending upon the direction of movement of the movable valve member 150) is always the same under similar conditions. It will be understood of course that the rate of flow of the fluid through the orifice 211 will depend to some extent upon the viscosity of the liquid but where the viscosity remains the same the flow through the orifice 211 is the same for any cycle of operation. That is to say the closing force on the movable valve element 150 exerted by the spring is always the same although it will vary throughout the movement owing to the variation in force exerted by the spring throughout its range of expansion.

We provide means for adjusting the rate of closure of the valve which means is employed primarily to adjust the rate of closure to compensate for changes in the viscosity of the liquids. Such viscosity changes occur principally when the temperature of the liquid changes or when the nozzle is employed in dispensing various liquids.

We provide a bore 215 extending from the lower end of the valve stem within the chamber 210, and communicating therewith, to a transverse bore 216 in that portion of the valve stem which is disposed above the wall 170 and therefore is located in the valve chamber 102.

Thus communication is provided between the inner chamber 210 and the valve chamber 102 which is in addition to and independent of the communication provided by the fixed orifice 211. The effective size of the passage provided by the bores 215 and 216 is made adjustable by providing an adjusting pin 220 which is adjustably slidable in a bore 221 in the valve stem 171 above the transverse bore 216, the pin 220 being so located that its lower end is movable into the transverse bore 216 to varying degrees depending upon the vertical position of the stem 220 in the bore 221.

The adjusting pin 220 is formed at its upper end with a head 222 which is externally threaded and is screwed into an internally threaded portion 223 of the bore 221. Thus, the pin 220 may be adjusted vertically in the bore 221 to thereby vary the extent of closure of the transverse orifice 216 by the lower end of the pin 220. The inner end of the pin 220 is sealed in the bore 221 in a suitable manner as by an O ring 224.

For the purpose of permitting adjustment of the pin 220 in the stem 171 without disassembly of the device we provide in the handle 200 an opening 225 in alignment with the bore 196. Thus the operator may insert a screw driver or other tool through the openings 225 and 196 to manipulate the pin 220 in the appropriate direction to effect the desired degree of adjustment of the orifice 215.

Means are provided for by-passing the orifices 211 and 215 during the opening movement of the valve so as to permit a more rapid flow of liquid between the chamber 210 and the valve chamber 102 and thereby permit the valve to be opened rapidly and without any substantial restriction upon such opening movement. To this end we provide in the upper wall 170 of the valve member 150 a plurality of orifices 230 which preferably are arranged in a circumferential series about the valve stem 171. The orifices 230 when open thus provide relatively free communication between the chamber 210 and the valve chamber 102 so that liquid may flow freely between these chambers.

A check valve is provided for closing the orifices 230 when the valve member 150 is moved downwardly towards closed position but for permitting the orifices to be opened during the upward or opening movement of the valve 150. To accomplish this we provide a disc or washer 240 which is supported for slight vertical movement relatively to the stem 171 and preferably we mount the disc 240 on a shoulder 241 formed on the nut 174. Thus the disc 240 is free to move through this limited vertical distance regardless of the position of the valve stem 171.

It will be seen that owing to the fact that the disc 240 is free to move as stated, movement of the valve member 150 in a downward direction will cause the liquid to exert an upward force upon the disc 240 to cause it to move into engagement with the face of the wall 170 and close the orifices 230. Conversely, when the valve member 150 is moved in an upward direction the disc is forced downwardly away from the inner ends of the orifices and the liquid allowed to flow through the orifices 230 and into the chamber 210.

In the use of the nozzle of our invention, the nozzle is connected to a hose or pipe leading from a source of liquid which is to be dispensed or discharged to a tank or the like. When the nozzle is in its normal condition and is not gripped by the operator, the spring 160 urges the valve member 150 into closed position closing the orifices 135 so that no liquid can flow out of the valve chamber 102 and through the ports 135 and outlet opening 136, and into the spout 114.

When it is desired to discharge the liquid the operator grips the grip portion 203 of the handle 200 and the handle portion 204 of the lever 180 and squeezes on these members. The lever 180 thereby is pivoted about its swinging pivot 182 and, acting through the ball socket or seat 190 and the ball 191 raises the valve stem 171 which lifts the valve member 150 against the downward force exerted thereon by the spring 160. The member 150 thus is raised to the position shown in full lines in Fig. 2 and the ports 135 are opened to allow a liquid to be discharged therethrough and into the spout 114 from whence it flows into the tank or other receptacle in which it is to be discharged. The upward movement of the valve 150 is relatively unimpeded owing to the fact that the check valve 240 opens at the start of the upward movement and allows liquid to flow into the chamber 210 freely through the fixed orifice 211 and also through the auxiliary orifices 230 as well as the adjustable orifice 216 and connected orifice 215.

When the filling operation has been completed the operator merely releases the lever 180 and the spring 160 urges the valve 150 toward closed position. Immediately upon the initiation of the downward movement of the valve 150 the check valve 240 closes and the liquid is constrained to flow from the chamber 210 into the valve chamber 102 slowly through the fixed orifice 211 and the adjustable orifice 216 and connecting passage 215. This provides a sufficient restriction upon the flow of liquid between the chamber 210 and the valve chamber 102 so that the valve member 150 moves downwardly at a substantially slower rate than it would were the dash-pot arrangement not provided and the downward movement was effected solely by the force of the spring 160 unrestrictedly.

The adjusting pin 220 is adjusted to a position to close the orifice 216 to the extent necessary to provide desired dash-pot action when the valve is moved from open to closed position. Whenever the viscosity of the liquid changes sufficiently the orifice 216 is adjusted accordingly so that the rate of closure of the valve is maintained at the desired rate. For example, if it is determined that the viscosity of the liquid has become less owing to an increase in temperature, then the pin 220 is screwed down into the valve stem 171 to further close the orifice 216 and thus provide a greater restriction upon the flow of liquid from the chamber 210 to the valve chamber 102. On the other hand if the viscosity of the liquid should become greater the pin 220 is backed off so as to open the orifice 216 to a greater extent. A similar adjustment is made where the nozzle is employed to dispense a liquid of a different nature and having a different viscosity than the liquid for which the nozzle is originally adjusted.

It will be seen that the valve construction is such that the valve is substantially balanced in respect to the liquid pressures thereon and the only unbalance is that due to the projection of the valve stem or actuating rod from the casing. When pressure is applied to the liquid in the valve casing it acts in a direction tending to force the stem further out of the casing. In this connection it will be noted that any pressure on the liquid in the valve housing will be transmitted to the liquid in the chamber 210. Thus, any pressure build up on the liquid because of the inertia thereof due to restriction of the flow as the valve is moved toward closed position will result in a force being applied to the valve member in a direction opposing the closing thereof. Accordingly, any slight unbalance due to the projection of the stem will aid in controlling the speed of closing of the valve and in cushioning the final closing movement.

The nozzle is provided with a grounding lead 250 mechanically and electrically connected to a metal portion of the nozzle and a clip 251 for connecting the lead 250 to a suitable ground such as a water pipe or the like.

There is shown in Figs. 5 to 10 another application of our invention wherein the valve is employed in connection with a fluid line (not shown) the valve being provided with a cam actuating mechanism which is adapted to be held in open position by a latch mechanism (not shown) which upon being tripped permits the valve to close under the influence of the valve closing spring. Such latch mechanism (not shown) is adapted to be actuated to release the valve upon the occurrence of various conditions, as for example the expiration of the predetermined time, in which case the latch mechanism is tripped by a timing mechanism, or by the occurrence of some predetermined condition which functions to trip the latch mechanism.

The valve includes a casing 300 defining a valve chamber 301 having an inlet 302 and an outlet 303. The casing preferably is formed with a flange 304 for attachment to a pipe (not shown).

A fixed valve seat member 305 which preferably is similar in all respects to the fixed valve member 104 above described in connection with Figs. 1 to 4 is disposed in the opening 303 and secured therein by a second casing or outlet member 310 suitably secured to the member 300 as by bolts and having a flange 311 for attachment to a pipe (not shown). The outlet member 310 is formed with an opening 311 which registers with the opening 312 in the fixed valve member 305. The flange portion 313 of the fixed valve member 305 is clamped between the outlet member 310 and a flange 314 on the casing member 310.

Slidable on the fixed valve member 305 is a movable valve member 315 which is similar in all respects to the slidable valve member 150 hereinabove described and which functions in a similar manner and forms with the fixed valve member 305 a dash-pot chamber 390. Extending through an opening 316 in the end wall 317 of the movable valve element 315 is a valve stem 320 which is secured in the wall 317 in a manner similar to that in which the valve stem 171 is secured in the valve wall 170. The valve stem carries a check valve member 321 which is adapted to cooperate with orifices 322 in the wall 317 to provide a check valve action in the same manner as the check valve 240 cooperates with the orifices 230 in the structure shown in Figs. 1 to 4 inclusive. Also, a fixed orifice 323 is provided in the end wall 317 similarly to the fixed orifice 211 shown in Fig. 2.

It should be noted at this point that the valve stem 320 is not provided with an auxiliary orifice similar to that provided in the valve stem 171, or an adjustable valve pin similar to the pin 220, although such an adjustable means may be provided if desired in this embodiment of the invention.

The movable valve element 315 is urged toward its closed position by a spring 330 which seats at one end against the upper wall of the casing 300 and at the other end against the flange 331 on the movable valve element 315 for closing the orifices 332 formed in the fixed valve element 305.

The movable valve element 315 is adapted to seat against a seal 335 formed in any suitable manner and preferably in a manner similar to the seal 152 shown in Figs. 1 to 4 inclusive.

For the purpose of opening the valve and for holding it in open position, we provide actuating mechanism now to be described.

Extending upwardly from and preferably formed integrally with the top of the casing member 300 is a post 350 of cylindrical form and having extending substantially throughout its length a slot 351 which at its upper end is open and terminates short of the bottom of the post. The slot 351 accommodates the valve stem 320 and a cross-piece 352 secured to the upper end of the valve stem 320, as by a pin 353. The cross-piece has trunnions 354 and serves as a cam follower for cooperation with a cam as hereinafter described.

Telescoped over the post 350 for rotational movement thereabout is a cylindrical cam member 355 (Figs. 7 and 9) having a pair of cam slots 356 formed therein and in which the projecting trunnions 354 of the cam follower 352 are positioned to ride. The cam member 355 is retained against upward movement relatively to the post 350 by a C ring 360 which is disposed in a groove 361 formed peripherally around the post 350 adjacent its upper end, which ring projects outwardly of the slot 361 to overlie the top end of the cam member 355 and thus prevent upward movement thereof.

Disposed over the top of the post 350 and the cam 355 is a bearing cap 362, the purpose of which will appear hereinafter. Disposed over and enclosing the cam member 355 and the cap 362 is a cover 370 of generally cupped form, the interior of which is so shaped that the side walls 371 thereof preferably fit snugly about the cam 355 and the cap 362. The cap 370 is formed with a wall 372 which overlies the cap 362 and has a depending central boss 378 resting upon a bearing 379 formed from suitable bearing material and disposed in a recess in the top of the cap 362.

The cap 370 is secured to the cam 355 whereby rotational movement of the cap 370 effects a similar movement of the cam 355. To this end we provide a screw 375 which is threaded into the cap 370 and has a portion 376 extending into an opening 377 formed in the side wall of the cam 355.

Extending laterally from the cap 370 and formed integrally therewith is an arm 380 having an eye 381 therethrough for attachment to a latch mechanism (not shown). The latch mechanism (not shown) is so constructed that when the valve is moved to open position the latch mechanism holds it in such open position against the action of the spring 330. However when the latch mechanism is tripped it releases the movable valve elements 315 for movement toward closed position.

We also provide means for manually rotating the cap 370 to open the valve. Accordingly, a pair of aligned bores 385 are provided which extend through the wall of the cap 370 and are adapted to receive an actuating handle 386 which preferably is secured in position, as by a set screw 387. Preferably, we provide a second set of similar aligned openings which are disposed at right angles to the first set of openings so that the actuating handle 386 may be removed from the first set of openings and placed in the second set, where the installation renders it advisable that the handle be so disposed.

In the operation of the valve shown in Figs. 5 to 10 the valve is opened by rotating the handle 386 in an appropriate direction to rotate the cap 370 suitably. This causes similar rotation of the cam 355 which causes the cross-piece 352 to ride up the slots 356 and raise the valve stem 320 and the members carried thereby including particularly the movable valve element 317. This lifting movement of the valve stem 320 is caused by reason of the fact that the cross-piece is slidably guided in the slot 351 and is prevented from rotating. Accordingly as the cam 350 is rotated it causes the cross-piece 352 to be moved in a vertical direction in its slot 351 in a corresponding direction.

When the valve 315 has been raised to its fully open position the latch mechanism (not shown) is caused to latch and to hold the movable valve member 315 in its open position against the force of the spring 330. When the latch mechanism (not shown) is tripped the valve member 315 is free to move toward closed position under the influence of the spring 330, the inclination of the cam slots 356 being such as to permit this movement to take place.

It will be understood that the cam mechanism shown in Figs. 5 to 10 may be slightly modified to provide a valve which can be opened manually and will remain in open position without the necessity of any latching mechanism and will be self-closing only after the handle is moved slightly to release the movable valve member. To this end we provide at the upper end of each cam slot a flat (not shown) whereby when the ears of the cross-piece are moved upwardly along the cam slots and then onto the flat the valve stem and movable valve members are held against downward movement until the ears are again moved off the flat and onto the inclined portion of the cam slots.

For convenience in describing the valve of Figs 5 to 10 it is described as so connected to a line and so operated that the direction of flow of liquid therethrough is from the valve chamber 301 through the ports 332 and the opening 312 and out through the member 310. However, the valve is fully reversible and may be so connected and operated that the flow is in the opposite direction namely through the member 310, the opening 312, the ports 332, to the valve chamber 301.

Figure 11:
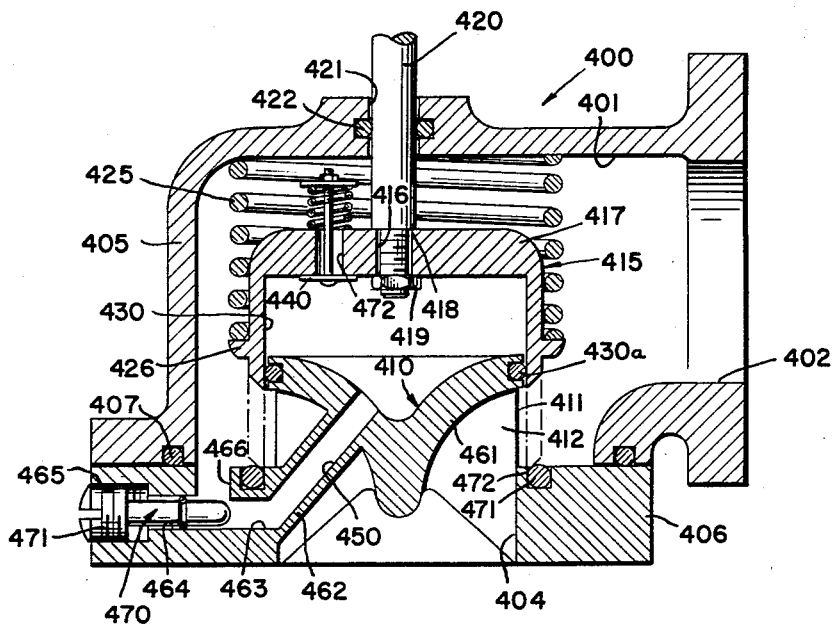
Fig. 11 is a vertical sectional view through still a third form of our invention.

Still a third form of our invention is illustrated in Fig. 11 to which reference now is made. In this form of the invention a valve is shown which is generally similar to the valve forming a portion of the structures of the first and second forms of the invention hereinabove described and illustrated in Figs. 1 to 10 inclusive of the drawings. The valve of the third embodiment however instead of being provided with an adjustable orifice formed in the valve 10 and as illustrated particularly in Fig. 2 of the drawings and a fixed orifice illustrated particularly in Figs. 2 and 7 of the drawings is provided merely with an adjustable orifice in the fixed valve seat member and a check valve in the movable valve element which check valve may be omitted as hereinafter explained.

The valve of Fig. 11 is formed generally similar to the two forms of valve illustrated in Figs. 1 to 10 of the drawings and described hereinabove except in respect to the features hereinafter particularly described and accordingly Fig. 11 will not be described in detail it being understood that where it is not described it is generally similar to the first two forms of the invention hereinabove described.

The valve of Fig. 11 includes a casing 400 defining a valve chamber 401 and having an inlet 402 and an outlet 404. In this connection it will be understood that this form of valve may be so connected that the flow of liquid through the valve is in a reverse direction from that indicated by the expressions "inlet" and "outlet" above. The casing preferably is formed by two members 405 and 406 which are connected together in a suitable manner as by screws (not shown) and the joint between such members is suitably sealed as by an O ring 407.

A fixed valve seat member 410 is provided which is generally similar to the fixed valve seat member 305 (Fig. 7) hereinabove described except as hereinafter explained. The fixed valve seat member 410 may be formed as an integral portion of the casing member 406 as shown or may be formed as a separate member secured in a suitable manner (not shown) to the casing member 410. The valve seat member 410 is formed with a plurality of partitions 411 defining ports 412 providing communication between the valve chamber 401 and the outlet 403.

Slidable on the fixed seat member 410 is a movable valve element 415 generally similar to the movable valve elements hereinabove described and functioning in a generally similar manner. The movable valve member 415 is movable between a position (as seen in full lines in Fig. 11) exposing the ports 412 and a closed position (as seen in broken lines in Fig. 11) closing the ports 412. Means are provided for sealing the closure between the movable valve element 415 and the valve seat member 406 when the movable valve element is in closed position so as to prevent leakage of liquid past the movable valve element 415. To this end preferably we provide an O ring seal 471 which is disposed in a groove 472 formed in the upper face of the member 406 and outwardly of the ports 412.

The slidable valve element 415 is normally urged toward closed position and remains in closed position except when moved out of such position by actuating means hereinafter described. To this end a closing spring 425 is provided which is seated against the upper, inner wall of the valve housing 400 and against the flange 426 formed integral with the movable valve member 415 in a manner similar to that hereinabove described in connection with the two previously described forms of the invention.

Extending through an opening 416 in the end wall 417 of the movable valve element 415 is a valve stem 420 which is secured in the wall 417 as by a shoulder 418 on the valve stem and a nut 419 which clamps the shoulder 418 against the outer (upper) face of the wall 417. The valve stem 420 extends through a suitable opening 421 in the upper wall of the casing 400 and is sealed therein as by an O ring 422. The valve stem 420 is connected to a suitable valve actuating means (not shown) for raising the movable valve member 415.

The movable valve member 415 is slidable on the fixed valve seat member 410 and a seal between these members is provided as by an O ring 430a disposed in a suitable groove in the fixed valve seat member 410. The fixed valve seat member 410 and the movable member 415 define therebetween a chamber 430 which is similar to and functions in a generally similar manner to the chamber 210 shown in Fig. 2. In other words, the chamber 430 functions in the manner of a dash-pot chamber when the valve 415 is moved relatively to the fixed valve seat member 410.

A check valve 440 may be provided in the wall 417 providing communication between the dash-pot chamber 413 and the valve chamber 410 during the upward movement of the valve member 415 but closing such communication during the downward movement. However, as will be understood as the description of this form of the invention proceeds such check valve 440 is not usually necessary.

Communication is provided between the dash-pot chamber 430 and the valve chamber 401 by an adjustable orifice 450 which is formed in the fixed valve seat member 410 and the casing member 406. As will be seen the orifice 450 includes a passage leading from the dash-pot chamber 430 through the fixed end wall portion 461 of the valve seat member 410, a passage provided in a tubular portion 462 of the fixed valve seat member 410, a passage 463 formed in the casing member 406 and extending radially thereof and a passage 466 communicating therewith extending axially of the casing and opening into the valve chamber 401. The passage 463 preferably is formed as a bore in the valve housing member 406 and has an extension 464 with a counterbored portion 465 adapted to accommodate an adjusting pin 470 which pin 470 extends into the passage 463 and has an enlarged head 471 threaded in the counterbore 465. Thus the pin 470 may be adjusted in and out of the passage 463 to vary the effective size of the orifice provided by the above described passages. Suitable adjustment of the adjusting pin 470 controls the rate of flow of liquid between the dash-pot chamber 430 and the casing chamber 401 when the valve member 415 is moved toward closed or open position respectively. Thus the passage defined by the portions 464 and 463 and the adjusting pin 470 function in a manner generally similar to the adjustable orifice and its adjusting pin shown in Fig. 2 and described hereinabove.

It will be noted that the adjusting pin 470 is adjustable from the exterior of the casing as in the case of the adjusting pin illustrated in Fig. 2. However the adjusting pin 470 is mounted in the casing proper and not in the valve stem and the construction thereof accordingly is considerably more simple than the construction of the adjusting pin and its mounting shown in Fig. 2.

It will be understood that the variable orifice construction illustrated in Fig. 11 may be embodied in a valve of the type shown in Fig. 2 wherein it is operated by a handle for use in a dispensing nozzle or in a valve such as shown in Fig. 7 wherein it is provided with a cam mechanism so that the valve may be "preset" in open position and "tripped" to permit it to close under the influence of a spring either by a manual operation or any suitable tripping mechanism (not shown).

The valve shown in Fig. 11 operates in a manner generally similar to the valve shown in Figs. 1 to 10 inclusive. The valve is opened by raising the slidable valve element through the agency of the valve stem 420. This is effected either manually, or mechanically by suitable actuating means (not shown), and the valve is held in open position either manually or by the actuating means (not shown). When it is desired to close the valve it is released whereupon it is moved into closed position by the spring 425 in which position it closes the ports 412 and seats against the seal 471 formed in the member 406.

During both the opening and closing movement of the valve element 415 the chamber 430 is vented to the chamber 401 through the orifice 450 above described, which permits the liquid to flow between the aforesaid chambers but the flow during the closing movement is restricted to the extent of the adjustment of the size of the orifice by the adjustment of the pin 470 so that the rate of movement is determined by the adjustment of the orifice. Thus, the closing action is controlled and the valve is prevented from closing faster than at a predetermined rate as determined by the adjustment of the orifice. Where the check valve 440 is provided, the opening of the valve is substantially unrestricted inasmuch as liquid can flow comparatively freely through the orifice 472 in which the check valve 440 is located in order to fill the chamber 430 rapidly and permit rapid opening of the valve element 415.

From the foregoing it will be seen that our invention provides a self-closing substantially balanced valve having means for controlling the speed of closing which valve is very simple but highly effective in operation. The novel utilization of the valve and valve seat members to provide the dash-pot action produces a very simple and compact structure. Moreover the dash-pot members are located entirely within the valve housing whereby the only member extending through the housing is the valve stem.

Where it is desired that the rate of closing be adjustable this is accomplished by the provision of novel means whereby such adjustment may be effected from outside of the housing and it is not necessary to open the housing or interfere with the operation of the line in which the valve is connected.

The valve is substantially balanced (insofar as liquid pressure forces thereon are concerned). The only unbalance is that due to the projection of the valve stem or actuating rod out of the casing and which causes a slight opening force which of course is overcome by the closing spring. Thus, the only force required to open the valve is substantially that necessary to overcome the force of the closing spring acting to close the valve. Thus, the opening force required is always the same and is entirely independent of fluid pressure. Moreover, the slight unbalance above mentioned is utilized to aid in retarding the closing of the valve and in cushioning the final closing movement.

The valve is well adapted to many uses including installation in fixed pipe lines and also in manually portable nozzles. It is especially useful in the latter adaptation in view of its simple, light and compact construction, the light force necessary to open it and the assurance that it will not be slammed shut by hydraulic pressure.

We claim:

1. A valve mechanism comprising a closed hollow casing defining a valve chamber and having an inlet and an outlet, a valve seat element in said casing having a valve seat, an opening through said seat, a sealing wall opposite said opening and a port between said sealing wall and said seat communicating with said opening, a valve element slidable on said seat element between a position closing said port and a position exposing said port, and providing with said sealing wall a dash-pot chamber, said valve element having therein a first orifice positioned to provide constant communication between said chambers, a second orifice in said valve element positioned to provide communication between said chambers, fluid pressure responsive valve means for closing said second orifice upon movement of said valve element toward port-closing position, a third orifice providing communication between said chambers, means operable exteriorly of said casing for adjusting the size of said third orifice, spring means urging said slidable valve toward closed position and means projecting out of said casing for moving said valve toward open position.

2. A valve mechanism comprising a hollow casing defining a valve chamber and having an inlet and an outlet, a valve seat within said housing intermediate said inlet and said outlet, a generally cylindrical valve element arranged on the inlet side of said valve seat, said valve element having a generally open end movable into engagement with said valve seat and having its other end substantially closed, spring means urging said valve element toward said valve seat, means for moving said valve element away from said valve seat, a sealing wall arranged in axial alignment with and fixed with respect to said valve seat on the inlet side thereof, said valve element having a sliding and sealing fit over said sealing wall whereby said sealing wall and said closed end of said valve element form a dashpot chamber, and a first orifice providing restricted communication between said dashpot chamber and the inlet portion of said valve chamber, a second orifice providing communication between said dashpot chamber and the inlet side of said valve chamber, and normally open check valve means closable by movement of said valve element toward said valve seat for closing said second orifice.

3. A valve mechanism comprising a hollow casing defining a valve chamber and having an inlet and an outlet, a valve seat within said housing intermediate said inlet and said outlet, a generally cylindrical valve element arranged on the inlet side of said valve seat, said valve element having a generally open end movable into engagement with said valve seat and having its other end substantially closed, spring means urging said valve element toward said valve seat, means for moving said valve element away from said valve seat, a sealing wall arranged in axial alignment with and fixed with respect to said valve seat on the inlet side thereof, said valve element having a sliding and sealing fit over said sealing wall whereby said sealing wall and said closed end of said valve element form a dashpot chamber, a first orifice providing continuous restricted communication between said dashpot chamber and the inlet portion of said valve chamber, a second orifice providing communication between said dashpot chamber and the inlet portion of said valve chamber, and gravity-opened check valve means for closing said second orifice upon movement of said valve element toward said valve seat.

4. A liquid valve mechanism comprising a casing defining a valve chamber and having inlet and outlet openings, a valve seat in said casing having a port therethrough, a partition in said casing between said valve chamber and said port having a sealing wall portion spaced from and in axial alignment with said seat and a supporting portion formed with a port providing communication between said valve chamber and said first-named port, a generally cup-shaped valve element slidable over said partition, in sealing relation with said sealing wall portion, between a closed position closing said second-named port, and wherein the open end seats against said valve seat, and an open position exposing said second-named port, said valve element and said sealing wall defining a dashpot chamber on the opposite side of said wall from said first-named port, which is reduced in volume upon closing movement of said valve element, a constantly open orifice providing restricted communication between said chambers, a second orifice, in said valve element, and providing communication between said chambers, means including a check valve for closing said second orifice upon movement of said valve element toward closed position, spring means constantly urging said valve element toward closed position and opening means, including an actuating member connected to said valve element for moving said valve element toward open position.

5. The invention as set forth in claim 4 wherein said supporting portion is formed with a plurality of ports disposed symmetrically about the axis of said seat.

6. The invention as set forth in claim 4 wherein said actuating member is disposed wholly on the side of said partition away from said first-named port.

7. A liquid valve mechanism comprising a casing defining a valve chamber and having inlet and outlet openings, a valve seat in said casing having a port therethrough, a partition in said casing between said valve chamber and said port having a sealing wall portion spaced from and in axial alignment with said seat and a supporting portion formed with a port providing communication between said valve chamber and said first-named port, a generally cup-shaped valve element slidable over said partition, in sealing relation with said sealing wall portion, between a closed position closing said second-named port, and wherein the open end seats against said valve seat, and an open position exposing said second-named port, said valve element and said sealing wall defining a dashpot chamber on the opposite side of said wall from said first-named port, which is reduced in volume upon closing movement of said valve element, a constantly open orifice providing restricted communication between said chambers, a second orifice, in said valve element, and providing communication between said chambers, means including a check valve for closing said second orifice upon movement of said valve element toward closed position and positioned to be urged open by gravity, closing means constantly urging said valve element toward closed position and opening means, including an actuating member connected to said valve element for moving said valve element toward open position.

8. The invention as set forth in claim 7 wherein said actuating member includes a valve stem secured to said valve element at the portion thereof opposite the open end thereof and said check valve includes a valve member carried by said valve stem in said dashpot chamber in position to move into closing relation with said second-named orifice when said valve element moves toward closed position.

(References on following page)

References Cited in the file of this patent

UNITED STATES PATENTS

| | | |
|---|---|---|
| 524,049 | Schutte | Aug. 7, 1894 |
| 915,624 | Perkins | Mar. 16, 1909 |
| 964,735 | Ashley | July 19, 1910 |
| 1,216,352 | Oleson | Feb. 20, 1917 |
| 1,935,299 | Siegert | Nov. 14, 1933 |
| 2,311,292 | Eilers | Feb. 16, 1943 |
| 2,795,391 | Krone | June 11, 1957 |

FOREIGN PATENTS

| | | |
|---|---|---|
| 141,017 | France | of 1881 |
| 28,396 | Austria | May 10, 1907 |
| 419,004 | France | Oct. 14, 1910 |
| 694,155 | Great Britain | July 15, 1953 |